United States Patent [19]

Hummel

[11] Patent Number: 5,719,863
[45] Date of Patent: Feb. 17, 1998

[54] METHOD AND ARRANGEMENT FOR FAST THROUGH-CONNECT OF VIRTUAL CONNECTIONS IN ATM COMMUNICATIONS SYSTEMS

[75] Inventor: Heinrich Hummel, Bergkirchen, Germany

[73] Assignee: Siemens Aktiengesellschaft, Munich, Germany

[21] Appl. No.: 588,937

[22] Filed: Jan. 19, 1996

[30] Foreign Application Priority Data

Jan. 26, 1995 [DE] Germany .................. 195 02 414.1

[51] Int. Cl.$^6$ ................................................ H04L 12/56
[52] U.S. Cl. .................... 370/392; 370/397; 370/400; 370/439
[58] Field of Search ...................... 370/389, 392, 370/395, 396, 397, 398, 399, 400, 409, 437, 438, 439; 379/65, 243, 258

[56] References Cited

U.S. PATENT DOCUMENTS

| 5,450,394 | 9/1995 | Gruber et al. ............... 370/253 |
| 5,453,979 | 9/1995 | Schibler et al. ............. 370/397 |
| 5,550,821 | 8/1996 | Akiyoshi .................... 370/397 |
| 5,627,836 | 5/1997 | Conoscenti et al. .......... 370/397 |

OTHER PUBLICATIONS

Siemens AG, (1992), ATM Technologie Für Zukünftige Breitbandnetze, pp. 1–22.

*Primary Examiner*—Benedict V. Safourek
*Assistant Examiner*—Ricky Q. Ngo
*Attorney, Agent, or Firm*—Hill, Steadman & Simpson

[57] ABSTRACT

A virtual connection (V) is pre-set from an originating to a destination ATM communication terminal equipment (KE (1),KE(2)) in an ATM communication network (KN) such that administration and maintenance cells (oam) can pass the preset connection (V). An administration and maintenance cell (oam1) is subsequently transmitted from the destination to the originating ATM communication terminal equipment (KE(2),KE(1)). An administration and maintenance and a through-connect information (oam3,di) inserted into the administration and maintenance cell (oam1) effect an immediate through-connect of the pre-set virtual connection (V) in the ATM communication systems (KS1,2) involved in the virtual connection (V). Alternatively, a known method for setting up and clearing down virtual connections can be incorporated into the method. As a result of the immediate through-connect, the "speech clipping" caused by a delayed through-connect due to signalling processing times is avoided, especially given telephone connections conducted via a plurality of ATM communication systems (KS).

13 Claims, 1 Drawing Sheet

METHOD AND ARRANGEMENT FOR FAST THROUGH-CONNECT OF VIRTUAL CONNECTIONS IN ATM COMMUNICATIONS SYSTEMS

BACKGROUND OF THE INVENTION

The present invention is directed to a method and apparatus for fast through-connect of virtual connections during a call setup in communication systems of a communication network operating in asynchronous transfer mode.

After a called subscriber at the destination communication terminal equipment picks up the receiver, telephone calls, particularly international telephone calls are not immediately through-connected. Such calls are delayed because of the signalling processing times required in the intervening communication systems (due to the processing times required in the switching-oriented programs). At the beginning of a telephone connection, this delayed through-connection leads to the known "speech clipping", that is, the first transmitted spoken words or, respectively, the first transmitted digitized voice information of the called subscriber do not arrive at the originating communication terminal equipment or, respectively, the calling subscriber. Since the first words usually contain the identification or name of the called subscriber, the name or identification of the called subscriber is consequently often not understood by the calling subscriber. This often leads to misunderstandings and delays at the start of a call that mean additional call charges, particularly in international telephone connections.

Such a delay also occurs in telephone connections in a communication network operating according to the standardized asynchronous transfer mode, known as ATM in the technical field. The digitized voice information is communicated in what are referred to as cells in an ATM communication network. The basic functioning of systems operating according to the ATM principle and the structure of standardized cells are described, for example, in "ATM Technologie für zukünftige Breitbandnetze", 1992, Siemens AG.

Two types of cell, the useful and the operations-oriented cells, are essentially provided in ATM communication networks. An identically structured cell header covering five bytes wherein cell type information and dependability-oriented information are contained in addition to switching-oriented routing information is common to all cells. The switching-oriented information represents virtual channel and path information with which the cells are communicated via the ATM communication systems. The virtual path and channel information are interpreted in the ATM communication systems and switching is carried out in conformity with the indicated destination telephone number. After an initialization of a virtual connection by a calling or, respectively, originating ATM communication terminal equipment, cells containing signalling information are formed therein or in the allocated ATM communication system and are communicated to the destination ATM communication terminal equipment via the communication network. A cell containing signalling information is indicated by a predetermined, virtual channel information. The switching-oriented settings of a switching matrix structure or, respectively, of an ATM switching matrix are determined in the transit ATM communication systems on the basis of what is usually a switching oriented program (call processing) using cells containing signalling information and dependent on the destination telephone number and the topology of the ATM communication network. In particular, the switching-oriented memories of the ATM switching matrix are thereby pre-set. After a response of the destination ATM communication terminal equipment, for example the called subscriber picks up the receiver, cells containing signalling information are communicated from the destination to the originating ATM communication terminal equipment via the ATM communication network, analogous to the call setup. The pre-set, virtual connecting path or, respectively, the virtual connection is through-connected using the signalling information. The signalling information effecting the through-connection is represented, for example, by a CONNECT message communicated in the switching-oriented layer (which corresponds to layer 3 of the OSI reference model). After the through-connection of the virtual connection, the incoming useful cells are switched via the through-connected connecting path in the ATM communication system.

The through-connection of the virtual connection is likewise implemented using the switching-oriented program on the basis of the signalling information, that is, the layer 3 CONNECT message. The layer 3 message must thereby be both recognized in the layer 2 and recognized as such and the individual information elements must be subsequently interpreted. This time-consuming recognition and evaluation of the signalling information causes delay times that produce the "speech clipping", particularly given a plurality of series-connected ATM communication systems, and especially in international connections.

Useful information, that is, digitized voice information in telephone connections, is communicated in the 48 byte long useful part (referred to as payload in the technical field) of useful cells. Such useful cells are identified in the cell header by a cell type information defining a useful cell and by channel information lying within a predetermined value range. Administration and maintenance cells are provided for the operation and administration of ATM communication systems, whereby a cell type information indicating an operations-oriented cell is entered in the cell header. Administration and maintenance or, respectively, administrative instructions or administration and maintenance or, respectively, administrative information are communicated from ATM communication system to ATM communication system or from an operations center to the ATM communications systems in the useful part of such administration and maintenance cells. The administration and maintenance or administrative information is represented by administration and maintenance layer 3 activation/deactivation information and by function information indicating the respective function to be implemented. The administration and maintenance or, respectively, administrative instructions can be implemented at once or, respectively, immediately in the ATM communication systems.

SUMMARY OF THE INVENTION

It is an object of the present invention to provide a method that prevents "speech clipping" in ATM communication networks.

In general terms the present invention is a method for fast through-connect of virtual connections during a call setup in communication systems of a communication network operating in asynchronous transfer mode (ATM). Information is switched and communicated between the ATM communication terminal equipment connected to the ATM communication systems via virtual connections using cells. Virtual connections are set up by cells containing call-associated signalling information. The information that operates and administers the ATM communication systems are communicated using cells defined as administration and maintenance cells. Each cell is formed by a cell header containing switching-oriented routing information and cell type information, and by a useful part that transmits useful, signalling and administration and maintenance information. A virtual connection is set up from an originating to a destination ATM communication terminal equipment by cells containing signalling information and corresponding to the signalling information such that administration and maintenance cells can be transmitted via an established connection (V). An administration and maintenance cell is transmitted from the destination to the originating ATM communication terminal equipment. The immediate through-connect of the respective virtual connection in the direction of the originating ATM communication terminal equipment is effected in each of the affected ATM communication systems by administration and maintenance information inserted into the useful part of the administration and maintenance cell and by through-connect information.

An important advantage of the inventive method is that the immediate through-connection of a virtual connection ensues using a known administration and maintenance instruction that, however, is provided with modified information. As a result, the outlay for an implementation of the inventive method in a communication system is reduced to a minimum since existing recognition and evaluation programs are utilized. Dependent on the switching principle realized in the respective communication system, the virtual connection is through-connected in the direction of the originating ATM communication terminal equipment or in both directions by the administration and maintenance cell communicated from the destination to the originating ATM communication terminal equipment. The through connection of the virtual connection in the direction of the destination ATM communication terminal equipment is alternatively possible after a mirroring of the communicated administration and maintenance cell in the originating ATM communication terminal equipment and transmission to the destination ATM communication terminal equipment in the respective transit ATM communication systems.

Another important advantage of a development of the inventive method is that the signalling procedure already known and implemented for ATM communication systems or, respectively, ATM communication networks is incorporated into the inventive method. In addition to the administration and maintenance cell that effects the immediate through-connect, a cell containing the known signalling information is also transmitted from the destination to the originating ATM communication terminal equipment. The signalling information represent a call information that effects the through-connect of the respective virtual connection in the affected communication systems. As a result thereof, the known procedure can continue to be employed unmodified and an immediate through-connect of the respective virtual connection is effected by additional transmission of an administration and maintenance cell only for the virtual connections wherein "speech clipping" is to be avoided. Accordingly the inventive method advantageously effects both the immediate through-connect of virtual connections and enables an arbitrary application of the inventive method to individual connections selected according to specific criteria or to all connections as well.

Since the administration and maintenance cells effecting the immediate through-connect are formed in the destination communication terminal equipment, an application of the inventive method that is individually associated to communication terminal equipment is additionally possible. Alternatively, the allocated, administration and maintenance cells can be formed in the destination ATM communication system and can be transmitted to the originating ATM communication system together with the cell containing the signalling information. The call-associated allocation of the administration and maintenance cell to a cell containing signalling information is achieved by inserting identical routing information into the cell header, whereby the routing information is represented by channel and path information.

Further advantageous developments of the inventive method as well as an advantageous fashioning of an arrangement for the implementation of the inventive method is as follows.

In addition to the administration and maintenance cell, at least one cell containing signalling information is communicated from the destination to the originating ATM communication terminal equipment. The signalling information represents a call information effecting the through-connect of the respective virtual connections in the affected communication systems.

The routing information contained in the cell header is represented by virtual channel and path information. A cell is defined as a cell containing signalling information by virtual channel information lying in a first sub-area or is defined as a cell containing useful information by a virtual channel information lying in a second sub-area, whereby signalling information is inserted into the useful part.

Administration and maintenance layer-3 instruction as administration and maintenance information and function information indicating the function "immediate through-connect of a virtual connection" as through-connect information are inserted into the useful part of an administration and maintenance cell.

The present invention is also an arrangement for fast through-connect of virtual connections during a call setup in communication systems of a communication network operating in asynchronous transfer mode, whereby information is switched and communicated between ATM communication terminal equipment connected to the ATM communication systems via virtual connections using cells. The arrangement has: means for setting up virtual connections with cells containing call-associated signalling information; means for the transmission of information that operates and administers the ATM communication systems using cells defined as administration and maintenance cells; means for forming cells with a cell header containing switching-oriented routing information and cell type information and with a useful part that transmits useful signalling and administration and maintenance information; means for setting up a virtual connection from an originating to a destination ATM communication terminal equipment by cells containing signalling information and corresponding to the signalling information that are fashioned such that administration and maintenance cells can be transmitted via the established connection; and means for transmitting an administration and maintenance cell from the destination to the originating ATM communication terminal equipment are fashioned such that the immediate through-connect of the respective virtual connection in the direction of the originating ATM communication terminal equipment is effected in each of the affected ATM communication systems by administration and maintenance information inserted into the useful part of the administration and maintenance cell and by through-connect information.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
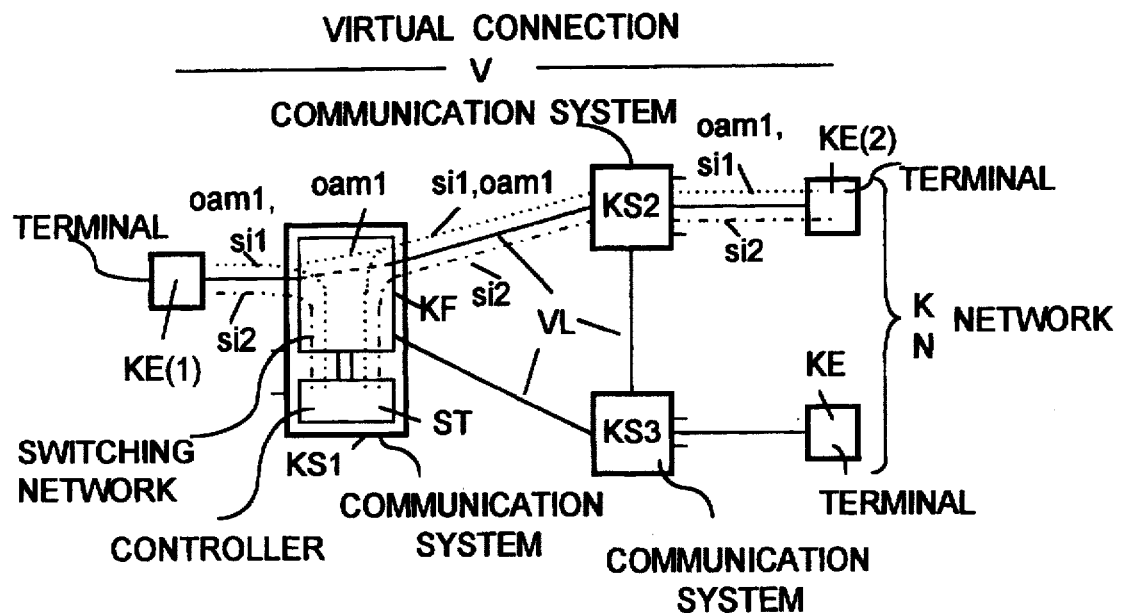
FIG. 1 is a block diagram of a communication network that operates according to the asynchronous transfer mode.

FIG. 1 shows a communication network KN operating according to the asynchronous transfer mode ATM that is formed by ATM communication systems. Three ATM communication systems KS1,KS2,KS3 are shown by way of example in the exemplary embodiment. The information exchange between the ATM communication systems KS1, KS2,KS3 occurs via trunks VL. Digital information, for example digitized voice or data information, is formed according to the asynchronous transfer mode in ATM communication terminal equipment KE connected to the ATM communication systems KS1,KS2,KS3 and are transmitted via the communication network KN to further ATM communication terminal equipment KE. This means that the digitized information is inserted into what are referred to as cells z and are switched or, respectively, communicated by the further ATM communication terminal equipment.

Figure 2:
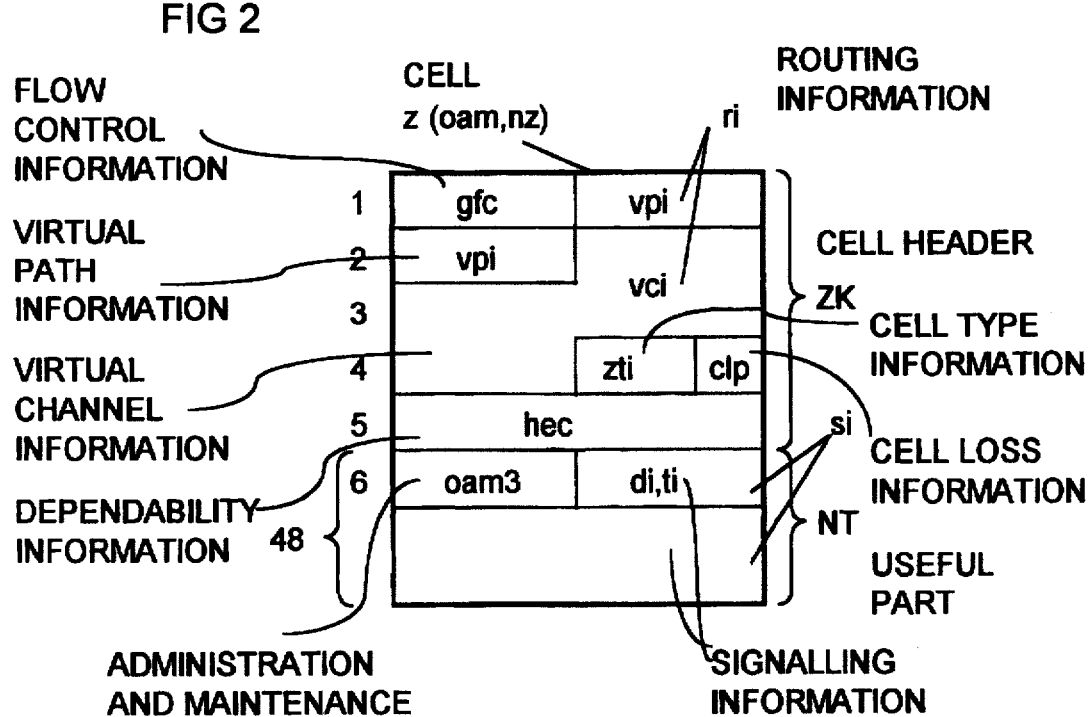
FIG. 2 depicts the structure of a cell.

The basic structure of such cells z is shown in FIG. 2. The cells z are composed of a useful part NT covering 48 octets (one octet is formed by eight bits) and of a cell header that covers 5 octets and contains routing information ri. Flow control information gfc, with which access of a plurality of ATM communication terminal equipment KE to a subscriber interface of an ATM communication system KS1 . . . 3 is coordinated, is entered into the first half-byte of the first octet. The following three octets represent routing information ri that is formed by virtual path information vpi covering one octet and by virtual channel information vci covering two octets. The cells z are communicated from an originating ATM communication terminal equipment to a destination ATM communication terminal equipment KE and vice versa via the ATM communication systems KS1, KS2,KS3 using the virtual path and channel information vpi,vci. A particular about the type of cell Z, that is, a cell type information zti, is indicated in one of the next three bits. A cell is defined as administration and maintenance cell oam or as useful cell nz by the binary information of the bit. A cell loss information clp is allocated to the following bit. Whether or not a loss of the respective cell z is more or less acceptable is indicated with the assistance of the cell loss information clp. The last octet comprises a dependability information hec by which the communication of the cell header ZK is monitored or, respectively, transmission errors are recognized and reported.

Inventively, an administration and maintenance layer-3 information oam3 as well as a through-connect information di are inserted into an administration and maintenance cell oam. The layer-3 information oam3, for example, is represented by a layer-3 activation or, respectively, deactivation information and the through-connect information di is represented, for example, by an information indicating the through-connect function.

Let it be assumed for the exemplary embodiment that a virtual connection V is to be set up from the first communication terminal equipment KE(1) connected to the first ATM communication system KS1 shown in FIG. 1 to the second ATM communication terminal equipment KE(2) connected to the second ATM communication system KS2. To this end, cells si2 containing signalling information are formed in the first or, respectively, originating ATM communication terminal equipment KE(1) and are communicated to the communication system KS1. A virtual channel information vci (for example, the channel information 5 according to standard) that respectively defines the cell z as a cell si2 containing signalling information si as well as a path information vpi are inserted into the cell header ZK of these cells si2 containing signalling information. A virtual connection V to the second ATM communication terminal equipment KE(2) is established or, respectively, set up with the assistance thereof and with the assistance of the signalling information (for example, the "call reference number") contained in the useful part. In the first ATM communication system KS1, the cells si2 containing signalling information are transmitted via an ATM switching network KF to a program-controlled controller ST, whereby the subscriber line equipment in the exemplary embodiment are to be viewed as being in the ATM switching network both procedurally as well as in circuit-oriented terms. The signalling information is interpreted in this controller ST using a switching-oriented program (call processing program), and a virtual path W, that is, a path W via which cells z are communicated, is calculated through the switching network KF. The ATM switching network is pre-set using the calculated information such that administration and maintenance cells oam can be switched via this path W. However this path W is not through-connected for other cells. After the interpretation, the cells si2 containing signalling information si are transmitted via the appertaining trunk VL to the second ATM communication system KS2. In the identically realized, second ATM communication system KS2, the cells si2 containing signalling information si are interpreted in the same way and a corresponding pre-setting (not shown) of the switching network is undertaken.

Subsequently, the cells SI2 containing signalling information are forwarded to the second or, respectively, destination ATM communication terminal equipment KE(2). The second ATM communication terminal equipment KE(2) interprets the reception of the cells si2 containing signalling information as a call setup request and, insofar as the call setup is accepted, forms an administration and maintenance cell oam1 and cells si1 that contain signalling information si. Routing and signalling information ri,si, with which the cells si1 containing signalling information si are communicated to the originating ATM communication terminal equipment KE(1) via the second and first ATM communication systems KS1,KS2 and the pre-set switching networks KF are through-connected for a further transmission of useful cells nz, are thereby inserted into the cells si1 containing signalling information si. Routing information ri according to the cells si1 containing signalling information are contained in the administration and maintenance cell oam1. Over and above this, an administration and maintenance layer-3 information oam3 as well as a through-connect information di are inserted into the useful part NT. The effect of the administration and maintenance cell oam1 is set forth by way of example with reference to the first ATM communication system KS1. The administration and maintenance cell oam1 arriving in the first or, respectively, originating ATM communication system KS1 is recognized in the subscriber lines circuits (not shown) on the basis of the cell type information zti and the administration and maintenance layer-3 information as well as the through-connect information di contained in the useful part NT are read. The administration and maintenance layer-3 information oam3 are interpreted as administration and maintenance instruction (for example, layer-3 activation message), as a result whereof the function "Through-Connect" recited in the through-connect information di is immediately implemented, that is, the virtual path W pre-set by the cells si2 containing signalling information si is immediately connected through in circuit-oriented terms.

The cells siI1 containing signalling information that are transmitted together with the administration and maintenance cell oam1 are recognized in the components (not shown) of the communication system KS1 relevant to layer 2 and proceed to the central controller ST and, using the switching-oriented program (call processing program), are recognized and interpreted therein, whereby the information elements of the administration and maintenance cell oam1 are to be separated and interpreted. Compared to an immediate implementation of an administration and maintenance layer-3 instruction, however, the separation and interpretation of the information elements using the switching-oriented program requires a considerably greater time outlay and leads to considerable time delays of the through-connect event, particularly given the series connection of a plurality of ATM communication systems KS. Given voice connections V, this means that digitized voice information formed in the destination ATM communication terminal equipment KE(2) at the beginning of a virtual connection V cannot proceed to the originating ATM communication terminal equipment KE(1) or, respectively, are lost (speech clipping). This disadvantage can be prevented by the inventive use of administration and maintenance cells oam1 and cells si1 additionally containing the known signalling information si in that the administration and maintenance layer-3 information oam3 (activation instruction) contained in the administration and maintenance information oam3 effects an immediate through-connect of the pre-set virtual path W in the switching networks KF. No formation and transmission of an administration and maintenance cell oam1 by the destination ATM communication terminal equipment KE(2) means that the virtual connection V is set up and through-connected in the usual way using the cells si1,si2 containing signalling information si. A connection V can thus be set up with or without immediate through-connection of the virtual paths W in the switching network KF. Alternatively, the administration and maintenance cell oam1 can be formed in the destination ATM communication system KS2 and allocated to cells si1 containing signalling information and can be communicated together with these via the communication network KN.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

I claim:

1. A method for fast through-connect of virtual connections during a call setup in communication systems of a communication network operating is asynchronous transfer mode, information being switched and communicated between ATM communication terminal equipment connected to the ATM communication systems via virtual connections using cells, comprising the steps of:

providing cells containing call-associated signalling information;

setting up virtual connections using the cells containing call-associated signalling information;

communicating information that operate and administer the ATM communication systems using cells defined as administration and maintenance cells;

forming each cell by a cell header containing switching-oriented routing information and cell type information and by a useful part that carries useful, signalling and administration and maintenance information;

setting up a respective virtual connection from an originating ATM communication terminal equipment to a destination ATM communication terminal equipment using cells containing signalling information and corresponding to the signalling information such that administration and maintenance cells transmittable via an established connection;

transmitting an administration and maintenance cell from the destination ATM communication terminal equipment to the originating ATM communication terminal equipment; and effecting an immediate through-connect of the respective virtual connection in the direction of the originating ATM communication terminal equipment in each affected ATM communication system of the ATM communication systems by administration and maintenance information inserted into the useful part of the administration and maintenance cell and by through-connect information.

2. The method according to claim 1, wherein the administration and maintenance information inserted into the useful part of the administration and maintenance cell and a through-connect information additionally effect the immediate through-connect of the respective virtual connection in the direction of the destination ATM communication terminal equipment in each of the affected ATM communication systems.

3. The method according to claim 1, wherein, after being received in the originating ATM communication terminal equipment, the administration and maintenance cell is additionally communicated therefrom to the destination ATM communication terminal equipment, the administration and maintenance information inserted into the useful part of the administration and maintenance cell and a through-connect information additionally effecting the immediate through-connect of the respective virtual connection in the direction of the destination ATM communication terminal equipment in each of the affected ATM communication systems.

4. The method according to claim 1, wherein, in addition to the administration and maintenance cell, at least one cell containing signalling information is communicated from the destination ATM communication terminal equipment to the originating ATM communication terminal equipment, the signalling information representing call information effecting the through-connect of the respective virtual connections in the affected communication systems.

5. The method according to claim 1, wherein the routing information contained in the cell header is represented by virtual channel information and path information, a cell being defined as a cell containing signalling information by virtual channel information lying in a first sub-area or is defined as a cell containing a useful information by a virtual channel information lying in a second sub-area, whereby signalling information are inserted into the useful part.

6. The method according to claim 1, wherein an administration and maintenance layer-3 instruction as administration and maintenance information and function information indicating the function "immediate through-connect of a virtual connection" as through-connect information are inserted into the useful part of an administration and maintenance cell.

7. An apparatus for fast through-connect of virtual connections during a call setup in communication systems of a communication network operating is asynchronous transfer mode, information being switched and communicated between ATM communication terminal equipment connected to the ATM communication systems via virtual connections using cells containing call-associated signalling information, comprising:

means for setting up virtual connections using cells containing call-associated signalling information;

means for communicating information that operate and administer the ATM communication systems using cells defined as administration and maintenance cells;

means for forming each cell by a cell header containing switching-oriented routing information and cell type information and by a useful part that carries useful, signalling and administration and maintenance information;

means for setting up a respective virtual connection from an originating ATM communication terminal equipment to a destination ATM communication terminal equipment using cells containing signalling information and corresponding to the signalling information such that administration and maintenance cells transmittable via an established connection; and means for transmitting an administration and maintenance cell from the destination ATM communication terminal equipment to the originating ATM communication terminal equipment;

wherein an immediate through-connect of the respective virtual connection in the direction of the originating ATM communication terminal equipment is effected in each affected ATM communication system of the ATM communication systems by administration and maintenance information inserted into the useful part of the administration and maintenance cell and by through-connect information.

8. An apparatus for fast through-connect of virtual connections during a call setup in communication systems of a communication network operating in asynchronous transfer mode, information being switched and communicated between ATM communication terminal equipment connected to the ATM communication systems via virtual connections using cells containing call-associated signalling information, comprising:

system for setting up virtual connections using cells containing call-associated signalling information;

system for communicating information that operate and administer the ATM communication systems using cells defined as administration and maintenance cells;

system for forming each cell by a cell header containing switching-oriented routing information and cell type information and by a useful part that carries useful, signalling and administration and maintenance information;

system for setting up a respective virtual connection from an originating ATM communication terminal equipment to a destination ATM communication terminal equipment using cells containing signalling information and corresponding to the signalling information such that administration and maintenance cells transmittable via an established connection; and system for transmitting an administration and maintenance cell from the destination ATM communication terminal equipment to the originating ATM communication terminal equipment;

wherein an immediate through-connect of the respective virtual connection in the direction of the originating ATM communication terminal equipment is effected in each affected ATM communication system of the ATM communication systems by administration and maintenance information inserted into the useful part of the administration and maintenance cell and by through-connect information.

9. The apparatus according to claim 8, wherein the administration and maintenance information inserted into the useful part of the administration and maintenance cell and a through-connect information additionally effect the immediate through-connect of the respective virtual connection in the direction of the destination ATM communication terminal equipment in each of the affected ATM communication systems.

10. The apparatus according to claim 8, wherein, after being received in the originating ATM communication terminal equipment, the administration and maintenance cell is additionally communicated therefrom to the destination ATM communication terminal equipment, the administration and maintenance information inserted into the useful part of the administration and maintenance cell and a through-connect information additionally effecting the immediate through-connect of the respective virtual connection in the direction of the destination ATM communication terminal equipment in each of the affected ATM communication systems.

11. The apparatus according to claim 8, wherein, in addition to the administration and maintenance cell, at least one cell containing signalling information is communicated from the destination ATM communication terminal equipment to the originating ATM communication terminal equipment, the signalling information representing call information effecting the through-connect of the respective virtual connections in the affected communication systems.

12. The apparatus according to claim 8, wherein the routing information contained in the cell header is represented by virtual channel information and path information, a cell being defined as a cell containing signalling information by virtual channel information lying in a first sub-area or is defined as a cell containing a useful information by a virtual channel information lying in a second sub-area, whereby signalling information are inserted into the useful part.

13. The apparatus according to claim 8, wherein an administration and maintenance layer-3 instruction as administration and maintenance information and function information indicating the function "immediate through-connect of a virtual connection" as through-connect information are inserted into the useful part of an administration and maintenance cell.

* * * * *